(12) United States Patent
Wang et al.

(10) Patent No.: US 12,164,079 B1
(45) Date of Patent: Dec. 10, 2024

(54) MULTI-CHANNEL EARLY WARNING SYSTEMS FOR REAL-TIME MONITORING OF METEOROLOGICAL DATA

(71) Applicant: CHINA YANGTZE POWER CO., LTD., Beijing (CN)

(72) Inventors: Hantao Wang, Beijing (CN); Ye Yin, Beijing (CN); Nanshan Zhao, Beijing (CN); Hui Zhang, Beijing (CN); Cuihua Chen, Beijing (CN); Yong Feng, Chengdu (CN)

(73) Assignee: CHINA YANGTZE POWER CO., LTD., Beijing (CN)

( * ) Notice: Subject to any disclaimer, the term of this patent is extended or adjusted under 35 U.S.C. 154(b) by 0 days.

(21) Appl. No.: 18/749,633

(22) Filed: Jun. 21, 2024

(30) Foreign Application Priority Data

Aug. 16, 2023 (CN) .......................... 202311028676.7

(51) Int. Cl.
*G01W 1/10* (2006.01)
*G01W 1/06* (2006.01)
(Continued)

(52) U.S. Cl.
CPC .............. *G01W 1/10* (2013.01); *G01W 1/06* (2013.01); *G01W 1/08* (2013.01); *G01W 1/14* (2013.01); *G08B 21/10* (2013.01)

(58) Field of Classification Search
CPC ........... G01W 1/10; G01W 1/06; G01W 1/08; G01W 1/14; G08B 21/10
See application file for complete search history.

(56) References Cited

U.S. PATENT DOCUMENTS

| | | | |
|---|---|---|---|
| 8,786,486 B1* | 7/2014 | Sperling | G01S 7/22 342/26 B |
| 11,954,415 B2* | 4/2024 | Chen | G06F 30/20 |

(Continued)

FOREIGN PATENT DOCUMENTS

| | | |
|---|---|---|
| CN | 102741895 A | 10/2012 |
| CN | 206460332 U | 9/2017 |

(Continued)

OTHER PUBLICATIONS

First Office Action in Chinese Application No. 202311028676.7 mailed on Nov. 18, 2023, 22 pages.

(Continued)

*Primary Examiner* — Daryl C Pope
(74) *Attorney, Agent, or Firm* — PORUS IP LLC

(57) ABSTRACT

Disclosed is a multi-channel early warning system for real-time monitoring of meteorological data, relates to the field of data monitoring technology, and comprises a meteorological data acquisition module, a meteorological data processing module, a terrain analysis module, a UAV deployment module, a ground situation acquisition module, an emergency degree analysis module, an early warning terminal, and a database. Data acquisition of a disaster-affected site is performed using a UAV. The UAV has the characteristics of being flexible and fast, and can be quickly deployed in a disaster-affected region to monitor the ground situation in real time, comprehensively assessing the impact of meteorological disasters. Then an emergency rescue level corresponding to the meteorological disaster site is analyzed, and different warning manners are provided for different emergency rescue levels, so that people's ability to monitor and respond to meteorological disasters can be greatly improved, and the relevant departments can take (Continued)

corresponding rescue and protection measures, thereby effectively reducing the impact and loss of disasters.

5 Claims, 3 Drawing Sheets

(51) Int. Cl.
*G01W 1/08* (2006.01)
*G01W 1/14* (2006.01)
*G08B 21/10* (2006.01)

(56) References Cited

U.S. PATENT DOCUMENTS

| | | | |
|---|---|---|---|
| 2018/0143326 A1* | 5/2018 | Joh | G08B 21/10 |
| 2021/0172421 A1* | 6/2021 | Ao | G06Q 10/067 |

FOREIGN PATENT DOCUMENTS

| | | |
|---|---|---|
| CN | 108288120 A | 7/2018 |
| CN | 112001565 A | 11/2020 |
| CN | 113611084 A | 11/2021 |
| CN | 113657732 A | 11/2021 |
| CN | 114862160 A | 8/2022 |
| CN | 115018365 A | 9/2022 |
| CN | 115903879 A | 4/2023 |
| KR | 20080023098 A | 3/2008 |
| KR | 20140103451 A | 8/2014 |

OTHER PUBLICATIONS

Notification to Grant Patent Right for Invention in Chinese Application No. 202311028676.7 mailed on Dec. 12, 2023, 7 pages.

* cited by examiner

200

210 Obtaining meteorological data corresponding to each acquisition time point of each acquisition point of a disaster-affected region from a meteorological observation station

220 Determining a predicted meteorological assessment coefficient corresponding to each acquisition time point of the disaster-affected region based on the meteorological data

230 Obtaining a water system distribution map corresponding to the disaster-affected region from a database, and determining a terrain complexity assessment coefficient corresponding to the disaster-affected region

240 Determining a takeoff time point and a flight altitude of a UAV corresponding to the disaster-affected region, respectively, based on the predicted meteorological assessment coefficient and the terrain complexity assessment coefficient

250 Obtaining a population density corresponding to the disaster-affected region from the database, and then acquiring a building image corresponding to the disaster-affected region by the UAV

260 Determining a disaster impact assessment coefficient corresponding to the disaster-affected based on the building image, and then determining an emergency degree assessment coefficient corresponding to the disaster-affected region based on the terrain complexity assessment coefficient and the disaster impact assessment coefficient to determine a rescue emergency level corresponding to the disaster-affected region

270 Performing a corresponding warning prompt based on the rescue emergency level

FIG. 2

MULTI-CHANNEL EARLY WARNING SYSTEMS FOR REAL-TIME MONITORING OF METEOROLOGICAL DATA

CROSS-REFERENCE TO RELATED APPLICATION

The present disclosure claims priority to Chinese Application No. 202311028676.7, filed on Aug. 16, 2023, the entire contents of which are incorporated herein by reference.

TECHNICAL FIELD

The present disclosure relates to the field of data monitoring technology, and in particular to a multi-channel early warning system for real-time monitoring of meteorological data.

BACKGROUND

Currently, global climate change has led to an increase and intensification of extreme weather events, which may cause serious harm to people's lives and property. However, the current meteorological early warning system has little effect on the rescue at the site of meteorological disasters after the meteorological disasters caused by extreme weather. Therefore, it is necessary to combine the meteorological warning and monitoring systems at the site of meteorological disasters to reduce the impact of meteorological disasters on rescue operations.

In the current operations of rescue at the disaster sites, unmanned aerial vehicles (UAV) are manually controlled to take pictures of the, and then the images of the disaster sites are analyzed, which is undoubtedly slow for the trapped people waiting for rescue by the rescue team. Moreover, due to the need for manual control of UAVs, the rescue team may not have enough rescuers, resulting in that the trapped people may not be able to obtain enough basic survival needs such as food and drinking water in time. This may increase illness, hypothermia or other health risks in extreme weather conditions, posing a serious risk to the safety of the trapped people.

Therefore, it is desirable to provide a multi-channel early warning system for real-time monitoring of meteorological data to improve the effect of meteorological warnings for the relief of disaster-affected region and help reduce the impacts and losses caused by extreme weather.

SUMMARY

One of the embodiments of the present disclosure provides a multi-channel early warning system for real-time monitoring of meteorological data. The multi-channel early warning system may comprise:
- a meteorological data acquisition module, configured to obtain meteorological data corresponding to each acquisition time point of each acquisition point of a disaster-affected region from a meteorological observation station, the meteorological data including rainfall and wind speed;
- a meteorological data processing module, configured to determine, based on the meteorological data, a predicted meteorological assessment coefficient corresponding to each acquisition time point of the disaster-affected region;

wherein the determining the predicted meteorological assessment coefficient corresponding to each acquisition time point of the disaster-affected region may include:
determining, by means of a calculation formula $$\delta_k = \sum_{i=1}^{n} \left( \frac{Ra_{i_k} - Ra_{i_{(k-1)}}}{Ra_{i_{(k+1)}} - Ra_{i_k}} * \omega_1 + \frac{Wv_{i_k} - Wv_{i_{(k-1)}}}{Wv_{i_{(k+1)}} - Wv_{i_k}} * \omega_2 \right),$$

the predicted meteorological assessment coefficient, wherein $\delta_k$ denotes a predicted meteorological assessment coefficient corresponding to the disaster-affected region at a kth acquisition time point, k denotes a number corresponding to each acquisition time point, k=1, 2, 3, ... m, and $Ra_{i_{(k-1)}}$, $Ra_{i_k}$, and $Ra_{i_{(k+1)}}$ denote the rainfall corresponding to (k−1)th, kth, and (k+1)th acquisition time points, respectively, of an ith acquisition point of the disaster-affected region, i denotes a number corresponding to each acquisition point, i=1, 2, 3, ... n, and $Wv_{i_{(k-1)}}$, $Wv_{i_k}$, and $Wv_{i_{(k+1)}}$ denote the wind speed corresponding to the (k−1)th, kth, and (k+1)th acquisition time points, respectively, of the ith acquisition point of the disaster-affected region, and $\omega_1$ and $\omega_2$ denote weighting factors corresponding to the rainfall and the wind speed, respectively;
- a terrain analysis module, configured to obtain a water system distribution map corresponding to the disaster-affected region from a database, and determine a terrain complexity assessment coefficient corresponding to the disaster-affected region;

wherein the determining the terrain complexity assessment coefficient corresponding to the disaster-affected region may include:
obtaining a contour density and a contour curvature corresponding to the disaster-affected region from the database, and determining, based on the contour density and the contour curvature, a terrain relief assessment coefficient corresponding to the disaster-affected region;
obtaining a count of water systems and an area of each of the water systems corresponding to the disaster-affected region from the water system distribution map, and determining, based on the count of water systems and the area of each of the water systems, a water system distribution assessment coefficient corresponding to the disaster-affected region;
determining, by means of a calculation formula $\zeta = \vartheta_1 * \tau_1 + \vartheta_2 * \tau_2$, the terrain complexity assessment coefficient, wherein $\zeta$ denotes the terrain complexity assessment coefficient, $\theta_1$ denotes the terrain relief assessment coefficient, $\theta_2$ denotes the water system distribution assessment coefficient, and $\tau_1$ and $\tau_2$ denote weighting factors corresponding to the terrain relief assessment coefficient and the water system distribution assessment coefficient, respectively;
wherein the determining the terrain relief assessment coefficient corresponding to the disaster-affected region may include:
determining, by means of a calculation formula $$\vartheta_1 = \frac{De' - De}{De} * \sigma_1 + \frac{Cd' - Cd}{Cd} * \sigma_2,$$

the terrain relief assessment coefficient, wherein De' denotes the contour density corresponding to a topographic map of the disaster-affected region, Cd' denotes the contour curvature corresponding to the topographic map of the disaster-affected region, De denotes a set reference contour density, Cd denotes a set reference contour curvature, $\sigma_1$ and $\sigma_2$ denote weighting factors corresponding to the contour density and the contour curvature, respectively;

determining a water system distribution assessment coefficient corresponding to the disaster-affected area, comprising:

determining, by means of a calculation formula $$\vartheta_2 = \sum_{i'=1}^{n'} \left( \frac{Q'-Q}{Q} * \sigma_3 + \frac{S_{i'}-S}{S} * \sigma_4 \right),$$

the water system distribution assessment coefficient, wherein $\theta_2$ denotes the water system distribution assessment coefficient, Q' denotes the count of water systems, $S_{i'}$ denotes an area of an i'th water system in the water system distribution map, i' denotes the number corresponding to each of the water systems in the water system distribution map, i'=1', 2', . . . , n', Q denotes a set reference count of water systems, S denotes a set reference area of each of the water systems, and $\sigma_3$ and $\sigma_4$ denote weighting factors corresponding to the count of water systems and the area of each of the water system;

an unmanned aerial vehicle (UAV) deployment module, configured to determine, based on the predicted meteorological assessment coefficient and the terrain complexity assessment coefficient, a takeoff time point and a flight altitude of a UAV corresponding to the disaster-affected region;

wherein the determining the takeoff time point and the flight altitude of the UAV corresponding to the disaster-affected region includes may include:

comparing the predicted meteorological assessment coefficient with a set predicted meteorological assessment coefficient threshold, if the predicted meteorological assessment coefficient corresponding to a certain acquisition time point is greater than or equal to the predicted meteorological assessment coefficient threshold, determining that the UAV does not take off; and if the predicted meteorological assessment coefficient corresponding to the certain acquisition time point is less than the predicted meteorological assessment coefficient threshold, determining that the UAV takes off, and taking the certain acquisition time point as the takeoff time point corresponding to the UVA;

comparing the terrain complexity assessment coefficient with a reference terrain complexity assessment coefficient stored in the database corresponding to each flight altitude of the UVA, if the reference terrain complexity assessment coefficient stored in the database corresponding to a certain flight altitude of the UVA is the same with the terrain complexity assessment coefficient, taking the flight altitude of the UVA corresponding to the reference terrain complexity assessment coefficient in the database as the flight altitude corresponding to the UVA;

a ground situation acquisition module, configured to obtain a population density corresponding to the disaster-affected region from the database, and acquire a building image corresponding to the disaster-affected region by the UVA;

an emergency degree analysis module, configured to determine, based on the building image, a disaster impact assessment coefficient corresponding to the disaster-affected region, and determine, based on the terrain complexity assessment coefficient and the disaster impact assessment coefficient, an emergency degree assessment coefficient corresponding to the disaster-affected region to determine a rescue emergency level of the disaster-affected region; and an early warning terminal, configured to perform a corresponding warning prompt based on the rescue emergency level.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 2 is flowchart illustrating an exemplary multi-channel early warning method for real-time monitoring of meteorological data according to some embodiments of the present disclosure.

DETAILED DESCRIPTION

Figure 1:
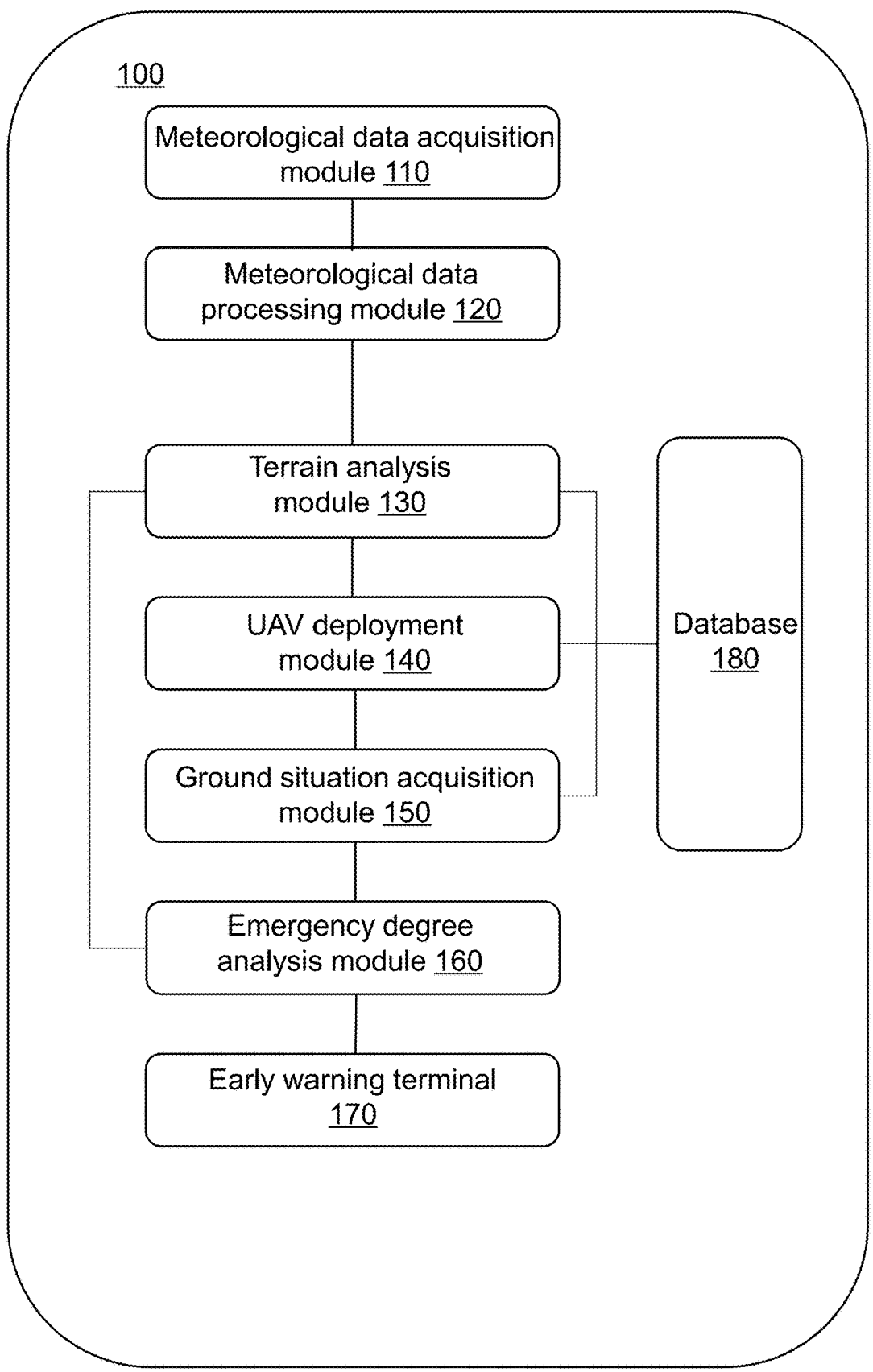
FIG. 1 is a structural diagram illustrating an exemplary multi-channel early warning system for real-time monitoring of meteorological data according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person having ordinary skills in the art to apply the present disclosure to other similar scenarios in accordance with these drawings without creative labor. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a structural diagram illustrating an exemplary multi-channel early warning system for real-time monitoring of meteorological data according to some embodiments of the present disclosure.

As shown in FIG. 1, in some embodiments, a multi-channel early warning system 100 for real-time monitoring of meteorological data may include a meteorological data acquisition module 110, a meteorological data processing module 120, a terrain analysis module 130, an unmanned aerial vehicle (UAV) deployment module 140, a ground situation acquisition module 150, an emergency degree analysis module 160, an early warning terminal 170, and a database 180.

The meteorological data processing module may be connected with the terrain analysis module and the meteorological data acquisition module, respectively. The terrain analysis module may be connected with the meteorological data processing module, the UAV deployment module, the emergency degree analysis module, and the database, respectively. The UAV deployment module may be connected with the terrain analysis module, the ground situation acquisition module, and the database, respectively. The ground situation acquisition module may be connected with the UAV deployment module, the emergency degree analysis module, and the database, respectively. The emergency degree analysis module may be connected with the terrain analysis module, the ground situation acquisition module, and the early warning terminal, respectively.

In some embodiments, the meteorological data acquisition module 110 may be configured to obtain meteorological data corresponding to each acquisition time point of each acquisition point of a disaster-affected region from a meteorological observation station. The meteorological data may include rainfall and wind speed.

In some embodiments, the meteorological data processing module 120 may be configured to determine, based on the meteorological data, a predicted meteorological assessment coefficient corresponding to each acquisition time point of the disaster-affected region.

In some embodiments, the terrain analysis module 130 may be configured to obtain a water system distribution map corresponding to the disaster-affected region from the database, and determine a terrain complexity assessment coefficient corresponding to the disaster-affected region.

In some embodiments, the UAV deployment module 140 may be configured to determine, based on the predicted meteorological assessment coefficient and the terrain complexity assessment coefficient, a takeoff time point and a flight altitude of a UAV corresponding to the disaster-affected region.

In some embodiments, the ground situation acquisition module 150 may be configured to obtain a population density corresponding to the disaster-affected region from the database, and acquire a building image corresponding to the disaster-affected region by the UVA.

In some embodiments, the emergency degree analysis module 160 may be configured to determine, based on the building image, a disaster impact assessment coefficient corresponding to the disaster-affected region, and determine, based on the terrain complexity assessment coefficient and the disaster impact assessment coefficient, an emergency degree assessment coefficient corresponding to the disaster-affected region to determine a rescue emergency level of the disaster-affected region.

In some embodiments, all or some of the modules (e.g., the meteorological data acquisition module 110, the meteorological data processing module 120, the terrain analysis module 130, the UVA deployment module 140, the ground situation acquisition module 150, the emergency degree analysis module 160, etc.) of the multi-channel early warning system 100 for real-time monitoring of the meteorological data may be integrated within a processor. The processor refers to a device or component configured to process information and/or data related to the multi-channel early warning system 100 for real-time monitoring of the meteorological data. The processor may execute program instructions based on such data, information, and/or processing results to perform one or more of the functions described herein.

In some embodiments, the early warning terminal 170 may be configured to perform a corresponding warning prompt based on the rescue emergency level. The early warning terminal may include one or more terminal devices or software used by a user, such as a mobile phone, a tablet computer, or the like. The user refers to a person, an operator, or the like, of the multi-channel early warning system 100 for real-time monitoring of the meteorological data.

In some embodiments, the multi-channel early warning system 100 for real-time monitoring of the meteorological data may include the database 180. The database 180 may be configured as a database that stores data such as a water system distribution map, a population density, a contour density and a contour curvature, a reference terrain complexity assessment coefficient corresponding to each flight altitude of the UAV.

In some embodiments of the present disclosure, the sharing of the stored data can be realized based on the database, the usage efficiency of data related to the multi-channel early warning system 100 for real-time monitoring of the meteorological data can be improved, and the efficiency and accuracy of data processing can be further improved, thereby improving the accuracy of rescue level prediction, and implementing different early warning manners for different emergency rescue levels.

Figure 3:
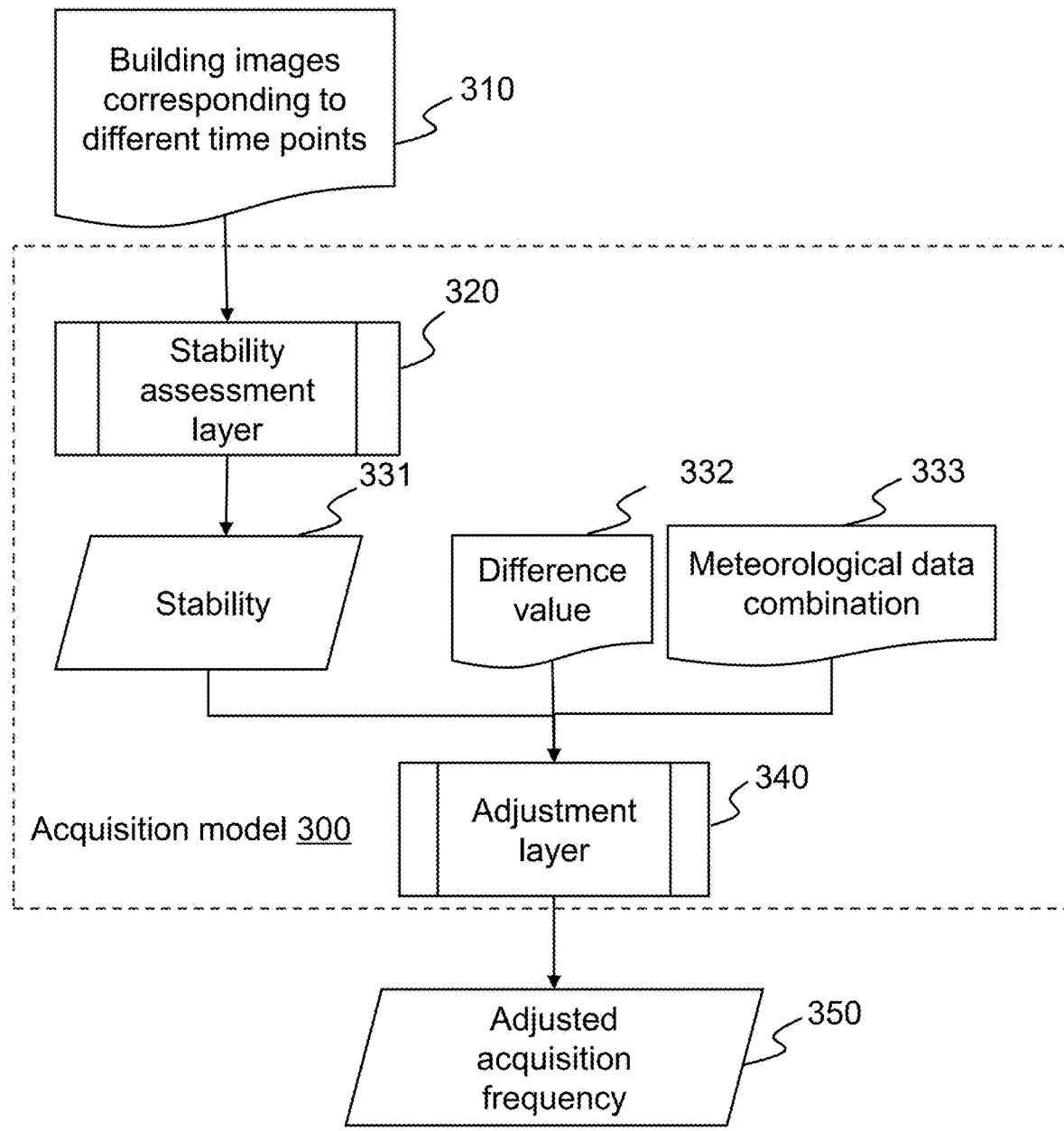
FIG. 3 is a schematic diagram illustrating an exemplary acquisition model according to some embodiments of the present disclosure.

More descriptions regarding the multi-channel early warning system 100 for real-time monitoring of the meteorological data and the modules thereof may be found in related descriptions in FIG. 2 and FIG. 3.

It should be noted that the above description of the multi-channel early warning system for real-time monitoring of the meteorological data and the modules thereof is only for convenience of description and does not limit the present disclosure to the scope of the embodiments. It should be understood that for those skilled in the art, after understanding the principle of the system, it is possible to arbitrarily combine the various modules without departing from this principle, or to form a subsystem to connect with other modules.

FIG. 2 is flowchart illustrating an exemplary multi-channel early warning method for real-time monitoring of meteorological data according to some embodiments of the present disclosure. In some embodiments, a process 200 may be performed by a plurality of modules of a multi-channel early warning system for real-time monitoring of the meteorological data or a processor. As shown in FIG. 2, the process 200 may include the following operations.

In 210, meteorological data corresponding to each acquisition time point of each acquisition point of a disaster-affected region may be obtained from a meteorological observation station. In some embodiments, the operation 210 may be performed by the processor or the meteorological data acquisition module 110.

The meteorological observation station refers to a station used for meteorological observation.

The disaster-affected region refers to a region that suffers from meteorological disasters caused by extreme weather.

The acquisition point refers to a position point in the disaster-affected region where meteorological data acquisition is performed. In some embodiments, the acquisition point may be determined by technical personnel. The acquisition point may be provided with a meteorological acquisition device. The meteorological acquisition device refers to a device for meteorological data acquisition. For example, the meteorological acquisition device may include a temperature and humidity sensor, an anemometer, or the like.

The acquisition time point refers to a time point at which meteorological data acquisition is performed. In some embodiments, the acquisition time point may be preset by the system or by a human. Time intervals between adjacent acquisition time points may be the same or different. In some embodiments, the meteorological data acquisition module may determine the time intervals between the acquisition time points based on an acquisition frequency. More descriptions regarding the acquisition frequency and determination thereof may be found in related descriptions in FIG. 1.

The meteorological data refers to data information related to meteorology. In some embodiments, the meteorological data may include rainfall and wind speed.

In some embodiments, the meteorological data acquisition module may be configured to obtain the meteorological data corresponding to each acquisition time point of each acquisition point of the disaster-affected region from the meteorological observation station. For example, the meteorological data acquisition module may wirelessly communicate with the meteorological observation station to obtain the meteorological data acquired by the meteorological observation station based on the weather acquisition device at the acquisition point. The meteorological observation station and the acquisition point may perform data transmission based on wireless communication.

In 220, a predicted meteorological assessment coefficient corresponding to each acquisition time point of the disaster-affected region may be determined based on the meteorological data.

The predicted meteorological assessment coefficient refers to an index used to characterize a predicted meteorological data situation of the disaster-affected region.

In some embodiments, the meteorological data processing module may be configured to determine the predicted meteorological assessment coefficient by means of a calculation formula $$\delta_k = \sum_{i=1}^{n} \left( \frac{Ra_{i_k} - Ra_{i_{(k-1)}}}{Ra_{i_{(k+1)}} - Ra_{i_k}} * \omega_1 + \frac{Wv_{i_k} - Wv_{i_{(k-1)}}}{Wv_{i_{(k+1)}} - Wv_{i_k}} * \omega_2 \right),$$

wherein $\delta_k$ denotes a predicted meteorological assessment coefficient corresponding to a kth acquisition time point of the disaster-affected region, k denotes a number corresponding to each acquisition time point, k=1, 2, 3, . . . m, and $Ra_{i_{(k-1)}}$, $Ra_{i_k}$, and $Ra_{i_{(k+1)}}$ denote the rainfall corresponding to (k−1)th, kth, and (k+1)th acquisition time points, respectively, of an ith acquisition point of the disaster-affected region, i denotes a number corresponding to each acquisition point, i=1, 2, 3, . . . n, $Wv_{i_{(k-1)}}$, $Wv_{i_k}$, and $Wv_{i_{(k+1)}}$ denote the wind speed corresponding to the (k−1)th, kth, and (k+1)th acquisition time points, respectively, of the ith acquisition point of the disaster-affected region, and $\omega_1$ and $\omega_2$ denote weighting factors corresponding to the rainfall and the wind speed, respectively.

In some embodiments, the weighting factors corresponding to the rainfall and the wind speed may be determined based on historical experience.

In some embodiments, the meteorological data processing module may be configured to adjust acquisition time intervals between future acquisition time points by adjusting the acquisition frequency of the acquisition point. In some embodiments, the meteorological data processing module may be configured to send a control instruction to the acquisition point of the meteorological observation station in communicating connection with the meteorological data acquisition module based on meteorological data corresponding to the disaster-affected region in a historical time period, and/or the predicted meteorological assessment coefficient, and/or a building image acquired by the UAV to adjust the acquisition frequency of the acquisition point. The meteorological observation station and the acquisition point may perform data transmission based on wireless communication. More descriptions regarding the building image may be found in the following descriptions in FIG. 2.

In some embodiments, the meteorological data processing module may be configured to obtain, based on historical data, the meteorological data corresponding to the disaster-affected region during a historical time period, the predicted meteorological assessment coefficient, and the building image acquired by the UAV.

The control instruction refers to an instruction related to controlling the acquisition point to adjust the acquisition frequency. In some embodiments, the meteorological data processing module may be configured to determine, based on the meteorological data corresponding to the disaster-affected region during the historical time period, and/or the predicted meteorological assessment coefficient, and/or the building image captured by the UAV, an adjustment amplitude of the acquisition frequency, and automatically generate the control instruction including the adjustment amplitude of the acquisition frequency.

The acquisition frequency refers to a frequency at which meteorological data acquisition is performed at the acquisition point. In some embodiments, the meteorological data processing module may be configured to determine, based on the meteorological data corresponding to the disaster-affected region during the historical time period, and/or the predicted meteorological assessment coefficient, and/or the building image captured by the UAV, the adjustment amplitude of the acquisition frequency in various ways.

For example, the meteorological data processing module may be configured to analyze the building image acquired by the UAV corresponding to the meteorological data during the historical time period through an emergency degree analysis module. When the emergency degree analysis module is unable to analyze the building image and/or a deviation of an analysis result from an actual result corresponding to the building image in the historical data exceeds a deviation threshold, the meteorological data processing module may determine a preset increase amplitude as the adjustment amplitude of the acquisition frequency. The preset increase amplitude may be preset by the system or by a human.

As another example, when the meteorological data corresponding to the disaster-affected region during the historical time period is stable, the meteorological data processing module may reduce the acquisition frequency. When the rainfall in the meteorological data corresponding to the disaster-affected region during the historical time period is lower than a rainfall threshold and the wind speed in the meteorological data corresponding to the disaster-affected region during the historical time period is lower than a wind speed threshold, the meteorological data processing module may determine that the meteorological data is stable.

Merely by way of example, the meteorological data processing module may determine a reduced acquisition frequency by querying a first preset table. The first preset table may include a correspondence relationship between different rainfalls, wind speeds, and the reduced acquisition frequency. The first preset table may be determined based on the historical data. For example, the meteorological data processing module may record acquisition frequencies under different rainfalls and wind speeds in a large amount of historical data, and establish the first preset table based on the correspondence relationship between different rainfalls, wind speeds and the acquisition frequencies. The meteorological data processing module may determine the adjustment amplitude of the acquisition frequency based on the reduced acquisition frequency and an acquisition frequency before adjustment.

As another example, the meteorological data processing module may determine the adjustment amplitude based on a difference value between the predicted meteorological assessment coefficient during the historical time period and an actual meteorological assessment coefficient of a corresponding acquisition time point. The actual meteorological assessment coefficient refers to an index used to characterize an actual meteorological data situation of the disaster-affected region, and is determined in a manner similar to that of the predicted meteorological assessment coefficient, which may be found in the previous descriptions in FIG. 2.

Merely by way of example, when the difference value between the predicted meteorological assessment coefficient during the historical time period and the actual meteorological assessment coefficient of the corresponding acquisition time point exceeds a preset meteorological threshold, the meteorological data processing module may determine the adjustment amplitude based on the difference value through a first preset rule. The first preset rule refers to a preset index for determining the adjustment amplitude based on the difference value. An exemplary first preset rule may be that the larger the difference value, the larger the corresponding adjustment amplitude. For example, the first preset rule may include the following formula: adjustment amplitude=1+difference value/preset meteorological threshold. The preset meteorological threshold may be determined based on the historical experience.

In some embodiments, the meteorological data processing module may be configured to determine an adjusted acquisition frequency through an acquisition model. More descriptions may be found in FIG. 3 and related descriptions thereof.

In some embodiments, the meteorological data processing module may be configured to send the control instruction to the acquisition point of the meteorological observation station based on the meteorological data acquisition module.

In some embodiments of the present disclosure, by adjusting the acquisition frequency of the acquisition point, a large amount of redundant data generated by the excessively high acquisition frequency can be avoided, and the situation that the meteorological data does not meet the usage requirements due to the excessively low acquisition frequency can be avoided, thereby helping to determine an accurate predicted meteorological assessment coefficient, and ensuring the reliability and efficiency of subsequent data acquisition by UAV.

In 230, a water system distribution map corresponding to the disaster-affected region may be obtained from a database, and a terrain complexity assessment coefficient corresponding to the disaster-affected region may be determined. In some embodiments, the operation 230 may be performed by the processor or the terrain analysis module 130.

The water system distribution map refers to a distribution map composed of various water bodies in the watershed of the disaster-affected region. It should be noted that water systems in the water system distribution map include, but are not limited to, ponds, rivers, lakes, etc.

The terrain complexity assessment coefficient refers to an index used to characterize terrain complexity of the disaster-affected region. In some embodiments, the higher the terrain complexity assessment coefficient, the higher the terrain complexity of the disaster-affected region.

In some embodiments, the terrain analysis module may be configured to obtain a contour density and a contour curvature corresponding to the disaster-affected region from the database, and determine an terrain relief assessment coefficient corresponding to the disaster-affected region based on the contour density and contour curvature; obtain a count of water systems and an area of each of the water systems corresponding to the disaster-affected region from the water system distribution map; and determine, by means of a calculation formula $\zeta=\vartheta_1*\tau_1+\vartheta_2*\tau_2$, the terrain complexity assessment coefficient, wherein $\zeta$ denotes the terrain complexity assessment coefficient, $\theta_1$ denotes the terrain relief assessment coefficient, $\theta_2$ denotes the water system distribution assessment coefficient, and $\tau_1$ and $\tau_2$ denote weighting factors corresponding to the terrain relief assessment coefficient and the water system distribution assessment coefficient, respectively.

The contour density refers to density of contour lines corresponding to the disaster-affected region. The contour curvature refers to a degree of curvature of contour lines corresponding to the disaster-affected region.

The terrain relief assessment coefficient refers to an index used to assess a degree of terrain relief in the disaster-affected region. In some embodiments, the higher the terrain relief assessment coefficient, the greater the terrain relief in the disaster-affected region. In some embodiments, the larger the contour density and the larger the contour curvature, the larger the terrain relief assessment coefficient.

In some embodiments, the terrain analysis module may be configured to determine the terrain relief assessment coefficient by the calculation formula $$\vartheta_1 = \frac{De' - De}{De} * \sigma_1 + \frac{Cd' - Cd}{Cd} * \sigma_2,$$

wherein De' denotes the contour density corresponding to a topographic map of the disaster-affected region, Cd' denotes the contour curvature corresponding to the topographic map of the disaster-affected region, De denotes a set reference contour density, Cd denotes a set reference contour curvature, $\sigma_1$ and $\sigma_2$ denote weighting factors corresponding to the contour density and the contour curvature, respectively.

The topographical map of the disaster-affected region refers to a projection map reflecting the terrain relief and a surface shape of the disaster-affected region. In some embodiments, the topographic map of the disaster-affected region may be stored in the database. The terrain analysis module may obtain, based on the topographic map of the disaster-affected region, the contour density and the contour curvature corresponding to the topographic map of the disaster-affected region.

The reference contour density and the reference contour curvature respectively refer to contour density and contour curvature that are used as references when the terrain relief assessment coefficient is determined. In some embodiments, the reference contour density and the reference contour curvature may be set by the system or by the human.

The weighting factors corresponding to the contour density and the contour curvature may be determined based on the historical experience.

In some embodiments, the weighting factor corresponding to the contour density and the weighting factor corresponding to the contour curvature may be related to an assessment reliability corresponding to an area of the disaster-affected region. More descriptions regarding the area of the disaster-affected region and the assessment reliability thereof may be found in the following descriptions in FIG. 2.

In some embodiments, the terrain analysis module may be configured to determine the weighting factor corresponding to the contour density based on the assessment reliability through a second preset rule, and determine the weighting factor corresponding to the contour curvature based on the weighting factor corresponding to the contour density.

The second preset rule refers to a preset rule for determining the weighting factor corresponding to the contour density. An exemplary second preset rule may be that the higher the assessment reliability corresponding to the area of the disaster-affected region, the greater the weighting factor corresponding to the contour density.

For example, the second preset rule may include the following formula: the weighting factor corresponding to the contour density=preset density factor*the assessment reliability. The preset density factor refers to a preset weighting factor corresponding to the contour density, such as 0.5, or the like. A sum of the weighting factor corresponding to the contour density and the weighting factor corresponding to the contour curvature is 1, so that the terrain analysis module may determine the weighting factor corresponding to the contour curvature based on the weighting factor corresponding to the contour density.

In some embodiments of the present disclosure, the determination of the terrain relief assessment coefficient can be more in line with the actual situation by considering the effect of the assessment reliability of the area of the disaster-affected region on the weighting factors corresponding to the contour density and the contour curvature.

In some embodiments, the terrain analysis module may be configured to determine the count of water systems and the area of each of the water systems based on the water system distribution map.

The water system distribution assessment coefficient refers to an index used to assess a distribution size of the water systems in the disaster-affected region. In some embodiments, the larger the water system distribution assessment coefficient, the larger the distribution of the water systems in the disaster-affected region.

In some embodiments, the more the count of water systems and the larger the area of each of the water systems, the greater the water system distribution assessment coefficient.

In some embodiments, the terrain analysis module may determine the water system distribution assessment coefficient by a calculation formula $$\theta_2 = \sum_{i'=1}^{n'} \left( \frac{Q' - Q}{Q} * \sigma_3 + \frac{S_{i'} - S}{S} * \sigma_4 \right),$$

wherein $\theta_2$ denotes the water system distribution assessment coefficient, Q' denotes the count of water systems, $S_{i'}$ denotes an area of an i'th water system in the water system distribution map, i' denotes the number corresponding to each of the water systems in the water system distribution map, i'=1', 2', . . . , n', Q denotes a set reference count of water systems, S denotes a set reference area of each of the water systems, and $\sigma_3$ and $\sigma_4$ denote weighting factors corresponding to the count of water systems and the area of each of the water systems.

The reference count of water systems refers to a count of water systems used as a reference when the water system distribution assessment coefficient is determined. The reference area of each of the water systems refers to an area of each of the water systems used as a reference when the water system distribution assessment coefficient is determined. In some embodiments, the reference count of water systems and the reference area of each of the water systems may be preset by the system or by a human.

The weighting factors corresponding to the count of water systems and the area of each of the water systems may be determined based on the historical experience.

In some embodiments, the weighting factor corresponding to the count of water systems and the weighting factor corresponding to the area of each of the water systems may be related to the area of the disaster-affected region. Description regarding the area of the disaster-affected region and the determination thereof may be found in the following descriptions in FIG. 2.

In some embodiments, the terrain analysis module may be configured to determine the weighting factor corresponding to the count of water systems based on the area of the disaster-affected region through a third preset rule, and determine the weighting factor corresponding to the area of each of the water systems based on the weighting factor corresponding to the count of water systems.

The third preset rule refers to a preset rule used to determine the weighting factor corresponding to the count of water systems. An exemplary third preset rule may be that the larger the area of the disaster-affected region, the greater the weighting factor corresponding to the count of water systems. For example, the third preset rule may include the following formula: the weighting factor corresponding to the count of water systems=a preset factor corresponding to the count of water systems*(the area of the disaster-affected region/a benchmark disaster-affected area). The preset factor corresponding to the count of water systems refers to a preset weighting factor corresponding to the count of water systems, such as 0.5, or the like. The benchmark disaster-affected area may be preset by the system or by a human. A sum of the weighting factor corresponding to the count of water systems and the weighting factor corresponding to the area of each of the water systems is 1, so that the terrain analysis module may determine the weighting factor corresponding to the area of each of the water systems based on the weighting factor corresponding to the count of water systems.

The larger the area of the disaster-affected region, the greater the impact of the count of water systems on the disaster-affected region. In some embodiments of the present disclosure, by adjusting the weighting factors corresponding to the count of water systems and the area of each of the water systems based on the area of the disaster-affected region, the requirements of the terrain analysis module for determining the water system distribution assessment coefficient can be satisfied, thereby ensuring the accuracy of determining the water system distribution assessment coefficient. In some embodiments, the weighting factors corresponding to the terrain relief assessment coefficient and the water system distribution assessment coefficient, respectively, may be determined based on the historical experience.

In some embodiments, the terrain analysis module may be configured to determine the weighting factor corresponding to the terrain relief assessment coefficient based on the area of the disaster-affected region; and determine the weighting factor corresponding to the water system distribution assessment coefficient based on the meteorological data.

In some embodiments, the terrain analysis module may determine the area of the disaster-affected region based on the meteorological data, and the building image acquired by the UAV during the historical time period.

In some embodiments, the terrain analysis module may fuse, based on the meteorological data, areas of regions where all the acquisition points are located corresponding to the time when the rainfall exceeds the rainfall threshold and/or the wind speed exceeds the wind speed threshold into an initial area of the disaster-affected region, and correct, based on the building image acquired by the UAV during the historical time period, the initial area of the disaster-affected region by various feasible image recognition techniques to obtain the area of the disaster-affected region. The terrain analysis module may determine an area of a range the meteorological data acquired at the acquisition point as an area of the region where the acquisition point is located. The range of the meteorological data acquired at the acquisition point may include an acquisition range of the meteorological acquisition device at the acquisition point.

An exemplary image recognition technique may include an edge detection algorithm, a support vector machine, etc. For example, the terrain analysis module may obtain an area of damaged buildings corresponding to the disaster-affected region through the image recognition technique based on the building image acquired by the UAV during the historical time period, and determine an area of damaged buildings excluding the initial area of the disaster-affected region as an additional area of disaster-affected region. A sum of the initial area of the disaster-affected region and the additional area of disaster-affected region may be determined as the area of disaster-affected region.

In some embodiments, the terrain analysis module may determine the weighting factor corresponding to the terrain relief assessment coefficient based on the area of the disaster-affected region in various ways.

In some embodiments, the terrain analysis module may be configured to determine, based on the area of the disaster-affected region, an initial weighting factor corresponding to the terrain relief assessment coefficient by querying a second preset table, and determine, based on the initial weighting factors corresponding to the terrain relief assessment coefficient and the water system distribution assessment coefficient, respectively, the weighting factors corresponding to the relief assessment coefficient and the water system distribution assessment coefficient, respectively. For example, the terrain analysis module may normalize the initial weighting factors corresponding to the terrain relief assessment coefficient and the water system distribution assessment coefficients, respectively, to determine the weighting factors corresponding to the terrain relief assessment coefficient and the water system distribution assessment coefficient, respectively. More descriptions may be found in the following descriptions in FIG. 2.

The second preset table may include a correspondence relationship between different areas of the disaster-affected region and the initial weighting factors corresponding to different terrain relief assessment coefficients, and may also include a correspondence relationship between different meteorological data and the initial weighting factors corresponding to different water system distribution assessment coefficients. The second preset table may be determined based on the historical data.

The correspondence relationship between different areas of the disaster-affected region and the initial weighting factors corresponding to different terrain relief assessment coefficients may be determined manually based on the historical data. For example, technicians may calculate an average impact of the same terrain relief assessment coefficient on building damage due to the area of the disaster-affected region based on the terrain relief assessment coefficient and the area of the disaster-affected region calculated in a historical disaster-affected region based on the building damage, and then determine the initial weighting factor corresponding to the terrain relief assessment coefficient corresponding to the area of the disaster-affected region. The higher the average impact, the greater the initial weighting factor corresponding to the terrain relief assessment coefficient. The building damage refers to the damage to buildings in the disaster-affected region, which may be expressed by a ratio of a count of damaged buildings to a total count of buildings. More descriptions regarding the count of damaged buildings may be found in the following descriptions in FIG. 2.

The correspondence relationship between different meteorological data and the initial weight factors corresponding to different water system distribution assessment coefficients may be manually determined based on the historical data. For example, the technicians may calculate a water system distribution assessment coefficient calculated in a historical disaster-affected region, and rainfall in the meteorological data of the disaster-affected region; and determine different impacts of the same water system distribution assessment coefficient on the building damage in the disaster-affected region due to different rainfalls to determine the initial weight factor corresponding to the water system distribution assessment coefficient corresponding to the meteorological data. The higher the impact, the greater the initial weighting factor corresponding to the water system distribution assessment coefficient.

In some embodiments, the terrain analysis module may be configured determine, based on the meteorological data, the weighting factor corresponding to the water system distribution assessment coefficient in various ways.

In some embodiments, the terrain analysis module may be configured to determine, based on the meteorological data, the initial weighting factor corresponding to the water system distribution assessment coefficient by querying the second preset table, and determine, based on the initial weighting factors corresponding to the terrain relief assessment coefficient and the water system distribution assessment coefficient, respectively, the weighting factors corresponding to the terrain relief assessment coefficient and the water system distribution assessment coefficient, respectively.

For example, the terrain analysis module may determine a ratio of the initial weighting factor corresponding to the terrain relief assessment coefficient to a sum of the initial weighting factors corresponding to the terrain relief assessment coefficient and the water system distribution assessment coefficient, respectively, as the weighting factor corresponding to the terrain relief assessment coefficient; and determine a difference between 1 and the weighting factor corresponding to the terrain relief assessment coefficient as the weighting factor corresponding to the water system distribution assessment coefficient.

In some embodiments, the terrain analysis module may be configured to determine, based on the meteorological data and the building image, an assessment reliability corresponding to the area of the disaster-affected region; and adjust, based on the assessment reliability, the weighting factor corresponding to the terrain relief assessment coefficient.

The assessment reliability refers to a degree of reliability to which the area of the disaster-affected region is determined.

In some embodiments, the terrain analysis module may be configured to determine, based on the meteorological data and the building image, the assessment reliability corresponding to the area of the disaster-affected region in various ways.

For example, the terrain analysis module may determine differential acquisition points based on the meteorological data and the building image, and determine the assessment reliability based on the differential acquisition points through a fourth preset rule. The differential acquisition points refer to acquisition points with different assessment results of the same acquisition point based on the meteorological data and the building image, respectively.

In some embodiments, the terrain analysis module may be configured to determine acquisition points that are different between the assessment results of the acquisition points based on the meteorological data and the assessment results of the same acquisition points based on the building image as the differential acquisition points. The assessment results of the acquisition points may include whether the acquisition point is the disaster-affected region.

In some embodiments, the terrain analysis module may be configured to determine, based on the meteorological data, the acquisition point corresponding to the meteorological data where the rainfall exceeds the rainfall threshold and/or the wind speed exceeds the wind speed threshold as the disaster-affected region.

In some embodiments, the terrain analysis module may be configured to determine, based on the building image, that the acquisition point of which the assessment results indicate the building damage as the disaster-affected region through image recognition technique. The fourth preset rule is a preset rule for determining the assessment reliability. An exemplary fourth preset rule may be that the more differential acquisition points, the lower the assessment reliability. The exemplary fourth preset rule may include the following formula: the assessment reliability=1−a total count of differential acquisition points/the total count of the acquisition points.

In some embodiments, the terrain analysis module may be configured to establish an acquisition point map based on the acquisition points of the meteorological observation station, and determine the assessment reliability through a reliability model based on the acquisition point map.

The acquisition point map refers to a map used to represent a relationship between various information among the acquisition points. In some embodiments, the terrain analysis module may be configured to establish the acquisition point map based on data related to the acquisition points within the disaster-affected region. One disaster-affected region may correspond to one acquisition point map.

The acquisition point map may include a plurality of nodes and a plurality of edges.

The plurality of nodes of the acquisition point map may correspond to the acquisition points of the meteorological observation station. Node attributes may include the meteorological data acquired at the corresponding acquisition points, the building images acquired by the UAV near the acquisition points, and monitoring reliabilities of the acquisition points. The monitoring reliabilities refer to degrees of reliabilities of assessment results (e.g., whether the acquisition is the disaster-affected region) of the acquisition points. The monitoring reliabilities of the acquisition points in an initial state may be 0.

The edges of the acquisition point map may be used to connect different nodes. The terrain analysis module may connect adjacent acquisition points with undirected edges. Edge attributes may include physical distances between different acquisition points corresponding to different nodes, and contour densities corresponding to the edges. The contour densities may reflect degrees of contour densities between the corresponding acquisition points.

In some embodiments, the terrain analysis module may be configured to determine, based on a topographic map of the disaster-affected region, the physical distances between different acquisition points corresponding to different nodes; and determine, based on a topographic map of the disaster-affected region, a count of contour lines intersecting with a certain edge as the corresponding contour density of the edge.

In some embodiments, the terrain analysis module may be configured to input the acquisition point map into the reliability model to obtain an updated monitoring reliability of the acquisition point corresponding to each of the plurality of nodes, and determine an average of all the monitoring reliabilities as the assessment reliability of the area of the disaster-affected region.

The reliability model refers to a model for determining the updated monitoring reliability of each of the plurality of nodes. In some embodiments, the reliability model may be a machine learning model, such as a graph neural network model, or the like.

In some embodiments, an input of the reliability model may include the acquisition point map, and an output of the reliability model may include may include the updated monitoring reliability corresponding to each acquisition point. The nodes in the graph neural network model may output the updated monitoring reliability corresponding to each acquisition point.

In some embodiments, the reliability model may be obtained by training based on first training samples with first labels. For example, a plurality of first training samples with the first labels may be input into an initial reliability model. A loss function may be constructed through the first labels and prediction results of the initial reliability model. The initial reliability model may be iteratively updated based on the loss function. The training may be completed when the loss function of the initial reliability model satisfies a preset condition. The preset condition may be that the loss function converges, a count of iterations reaches a threshold, or the like.

In some embodiments, the first training samples may include a sample acquisition point map. The first training samples may be generated based on the historical data. The construction of the sample acquisition point map may be similar to the construction of the acquisition point map, which may be found in the previous descriptions in FIG. 2.

The first labels may include an actual monitoring reliability of each acquisition point in the sample acquisition point map. In some embodiments, the terrain analysis module may determine the first labels through the assessment results of the acquisition points acquired based on actual meteorological data and actual architectural images.

For example, the terrain analysis module may determine an acquisition point of which an assessment result corresponding to that rainfall exceeds the rainfall threshold as the disaster-affected region; and determine an acquisition point of which a count of images including the building damage of a plurality of building images exceeds a preset count threshold as the disaster-affected region.

Merely by way of example, the terrain analysis module may determine the first labels corresponding to acquisition points with consistent assessment results as 1. The consistent assessment results refer to that the assessment results of the acquisition points acquired based on the actual meteorological data are the same as the assessment results of the acquisition points acquired based on the actual building images. When the assessment results are inconsistent, the terrain analysis module may determine a ratio of the count of images including the building damage to a preset count threshold as the first label corresponding to the acquisition point.

In some embodiments, the terrain analysis module may be configured to adjust the weighting factor corresponding to the terrain relief assessment coefficient based on the assessment reliability through a fifth preset rule. The fifth preset rule refers to a preset rule for determining the weighting factor corresponding to the adjusted terrain relief assessment coefficient. An exemplary fifth preset rule may be that the higher the assessment reliability, the higher the weighting factor corresponding to an adjusted terrain relief assessment coefficient.

For example, the fifth preset rule may include the following formula: the weighting factor corresponding to the adjusted terrain relief assessment coefficient=a preset terrain relief factor*the assessment reliability. The preset terrain relief factor may be a weighting factor corresponding to the terrain relief assessment coefficient determined by the area of the disaster-affected region. The related descriptions may be found in the previous descriptions in FIG. 2.

In some embodiments of the present disclosure, the weighting factor corresponding to the terrain relief assessment coefficient may be adjusted based on the assessment reliability of the area of the disaster-affected region, which helps to determine a more accurate terrain complexity assessment coefficient.

The impact of the terrain relief and the water system distribution on disaster-affected region is different with different areas of the disaster-affected region and different severities of the meteorological data. In some embodiments of the present disclosure, the area of the disaster-affected region may be determined based on the meteorological data and the building image, and then the reasonable weighting factors corresponding to the terrain relief assessment coefficient and the water system distribution assessment coefficient may be determined, which can ensure the reliability and rationality of the determined terrain complexity assessment coefficient.

In 240, a takeoff time point and a flight altitude of a UAV corresponding to the disaster-affected region may be determined, respectively, based on a predicted meteorological assessment coefficient and the terrain complexity assessment coefficient. In some embodiments, the operation 240 may be performed by the processor or the UAV deployment module 140. The UAV may take off at the takeoff time point and fly at a determined flight altitude to acquire the building image of the disaster-affected region. More descriptions regarding the building image may be found in the related descriptions in operation 250.

In some embodiments, the UAV deployment module 140 may be configured to compare the predicted meteorological assessment coefficient with a set predicted meteorological assessment coefficient threshold. If the predicted meteorological assessment coefficient corresponding to a certain acquisition time point is greater than or equal to the predicted meteorological assessment coefficient threshold, it is determined that the UAV cannot take off; and if the predicted meteorological assessment coefficient corresponding to the certain acquisition point is less than the predicted meteorological assessment coefficient threshold, it is determined that the UAV can take off, and the acquisition time point may be taken as the takeoff time point corresponding to the UAV.

The predicted meteorological assessment coefficient threshold is a maximum value of the predicted meteorological assessment coefficient when the UAV is ready for takeoff. In some embodiments, the predicted meteorological assessment coefficient threshold may be determined based on the historical experience.

In some embodiments, the predicted meteorological assessment coefficient threshold may be related to time intervals between different future acquisition time points and current prediction time. The processor may dynamically generate different predicted meteorological assessment coefficient thresholds based on the time intervals between the different future acquisition time points and the current prediction time.

In some embodiments, the processor may determine, based on the time intervals between the different future acquisition time points and the current prediction time, the predicted meteorological assessment coefficient thresholds corresponding to the different future acquisition time points through a sixth preset rule. The sixth predetermined rule refers to a preset rule for determining the predicted meteorological assessment coefficient threshold.

An exemplary sixth predetermined rule may be that the longer the time interval between a future acquisition time point and the current prediction time, the smaller the corresponding predicted meteorological assessment coefficient threshold. For example, the sixth preset rule may include the following formula: the predicted meteorological assessment coefficient threshold=benchmark threshold+floating threshold; wherein the floating threshold=benchmark threshold* (1−the time interval between the future acquisition time point and the current prediction time/a total length of a future time period). The benchmark threshold may be determined based on the historical experience.

In some embodiments, the processor may adjust the predicted meteorological assessment coefficient threshold based on a stability of the building image acquired by the UAV during the historical time period. More descriptions regarding the stability of the building image acquired by the UAV during the historical time period may be found in FIG. 3 and related descriptions thereof.

In some embodiments, the processor may determine an adjusted predicted meteorological assessment coefficient threshold based on the stability of the building image acquired by the UAV during the historical time period through a seventh preset rule. The seventh preset rule refers to a preset rule for adjusting the predicted meteorological assessment coefficient threshold. An exemplary seventh preset rule may be that the higher the stability, the lower the corresponding predicted meteorological assessment coefficient threshold. The exemplary seventh preset rule may include the following formula: the adjusted predicted meteorological assessment coefficient threshold=the benchmark threshold+the floating threshold/the stability.

In some embodiments of the present disclosure, the flight safety and reliability of the UAV can be improved by adjusting the predicted meteorological assessment coefficient threshold through the stability of the building image acquired by the UAV during historical time period, so that the acquisition quality and efficiency of the building image of the disaster-affected region can be improved, and repeated flight acquisition can be avoided.

In some embodiments of the present disclosure, the predicted meteorological assessment coefficient thresholds corresponding to the different future acquisition time points may be determined based on the time intervals between the future acquisition time points and the current prediction time, so that the predicted meteorological assessment coefficient thresholds can be more realistic, and the problems such as improper takeoff time of the UAV can be avoided.

In some embodiments, the UAV deployment module may be configured to compare the terrain complexity assessment coefficient with a reference terrain complexity assessment coefficient stored in the database corresponding to each flight altitude of the UVA. If the reference terrain complexity assessment coefficient stored in the database corresponding to a certain flight altitude of the UVA is the same with the terrain complexity assessment coefficient, the UAV deployment module may take the flight altitude of the UVA corresponding to the reference terrain complexity assessment coefficient in the database as the flight altitude corresponding to the UVA.

In some embodiments, if there is no reference terrain complexity assessment coefficient stored in the database that is the same as the terrain complexity assessment coefficient, the UAV deployment module may take a flight altitude of the UVA corresponding a reference terrain complexity assessment coefficient most similar to the terrain complexity assessment coefficient as the flight altitude corresponding to the UAV. The reference terrain complexity assessment coefficient most similar to the terrain complexity assessment coefficient refers to a reference terrain complexity assessment coefficient that has a smallest difference with the terrain complexity assessment coefficient.

The reference terrain complexity assessment coefficient refers to a terrain complexity assessment coefficient used as a reference when the flight altitude is determined. In some embodiments, the reference terrain complexity assessment coefficient may be determined based on the historical experience.

In 250, a population density corresponding to the disaster-affected region may be obtained from a database, and then a building image corresponding to the disaster-affected region may be acquired by the UAV. In some embodiments, the operation 250 may be performed by the processor or the ground situation acquisition module 150.

The building image refers to an image associated with buildings in the disaster-affected region. In some embodiments, the ground situation acquisition module may acquire the building image corresponding to the disaster-affected region based on the UAV. It should be noted that the UAV corresponding to the disaster-affected region may acquire the building image through an image acquisition device, such as a high-definition camera provided on the UAV. For example, the ground situation acquisition module may take pictures of the disaster-affected region based on the high-definition camera of the UAV to obtain the building image.

In some embodiments of the present disclosure, the building image of the disaster-affected region may be acquired using the UAV. The UAV has the characteristics of being flexible and fast, and can be quickly deployed in the disaster-affected region, and can also carry the high-resolution camera, thereby helping to monitor ground situations in real time.

In 260, a disaster impact assessment coefficient corresponding to the disaster-affected region may be determined based on the building image, and then an emergency degree assessment coefficient corresponding to the disaster-affected region may be determined based on the terrain complexity assessment coefficient and the disaster impact assessment coefficient to determine a rescue emergency level corresponding to the disaster-affected region. In some embodiments, the operation 260 may be performed by the processor of the emergency degree analysis module 160.

The disaster impact assessment coefficient refers to an index used to characterize an extent to which the disaster-affected region is affected by a disaster. The greater the disaster impact assessment coefficient, the greater the degree to which the disaster-affected area is affected by the disaster.

In some embodiments, the emergency degree analysis module may obtain a count of damaged buildings and an area of damaged buildings in the building image from the building image, and determine the disaster impact assessment coefficient by a $$\chi = \frac{Bd - Bd'}{Bd} * \gamma_1 + \frac{Bs - Bs'}{Bs} * \gamma_2 + \frac{Z'}{Z} * \gamma_3,$$

calculation formula wherein x denotes the disaster impact assessment coefficient, Bd denotes a set allowed count of damaged buildings, Bs denotes a set allowed area of damaged buildings, Bd' denotes the count of damaged buildings, Bs' denotes the area of damaged buildings, Z' denotes the population density, Z denotes a set reference population density, and $\gamma_1$, $\gamma_2$, and $\gamma_3$ denote weighting factors corresponding to the count of damaged buildings, the area of damaged buildings, and the population density, respectively.

In some embodiments, the emergency degree analysis module may be configured to obtain the count of damaged buildings and the area of damaged buildings in the building image from the building image by using the image recognition technique.

The allowed count of damaged buildings refers to an allowed count of buildings damaged in the disaster-affected region.

The allowed area of damaged buildings refers to an allowed area of buildings damaged in the disaster-affected region.

The reference population density refers to a population density used as a reference when the disaster impact assessment coefficient is determined. In some embodiments, the allowed count of damaged buildings, the allowed area of damaged buildings, and the reference population density may be preset by the system or by the human.

In some embodiments, the weighting factors corresponding to the count of damaged buildings, the area of damaged buildings, and the population density may be determined based on the historical experience.

In some embodiments of the present disclosure, the disaster impact assessment coefficient may be determined through the count of damaged buildings, the area of damaged buildings, and the population density, which can synthesize various influencing factors to determine a more accurate and realistic disaster impact assessment coefficient.

The emergency degree assessment coefficient refers to an index used to characterize a degree of emergency of the disaster-affected region that requires rescue. In some embodiments, the greater the terrain complexity assessment coefficient and the greater the disaster impact assessment coefficient, the greater the emergency degree assessment coefficient.

In some embodiments, the emergency degree analysis module may determine the emergency degree assessment coefficient by a calculation formula $$\varphi = \frac{\zeta' - \zeta}{\zeta'} * \alpha_1 + \frac{\chi' - \chi}{\chi'} * \alpha_2,$$

wherein Φ denotes the emergency degree assessment coefficient, ζ denotes the terrain complexity assessment coefficient, x denotes the disaster impact assessment coefficient, ζ' denotes a set reference terrain complexity assessment coefficient, x' denotes a set reference disaster impact assessment coefficient, and $\alpha_1$ and $\alpha_2$ denote weighting factors corresponding to the terrain complexity assessment coefficient and the disaster impact assessment coefficient, respectively.

The reference terrain complexity assessment coefficient refers to a terrain complexity assessment coefficient used as a reference when the emergency degree assessment coefficient is determined. The reference disaster impact assessment coefficient refers to a disaster impact assessment coefficient used as a reference when the emergency degree assessment coefficient is determined. The reference terrain complexity assessment coefficient and the reference disaster impact assessment coefficient may be preset by the system or by the human.

In some embodiments, the weighting factors corresponding to the terrain complexity assessment coefficient and the disaster impact assessment coefficient may be determined based on the historical experience.

In some embodiments of the present disclosure, the impact of the terrain complexity assessment coefficient and the disaster impact assessment coefficient on the emergency degree assessment coefficient may be considered comprehensively, helping determine a more accurate emergency degree assessment coefficient.

The rescue emergency level refers to an emergency level for rescue in the disaster-affected region. The higher the rescue emergency level, the higher the priority for rescuing the disaster-affected region.

In some embodiments, the emergency degree analysis module may be configured to compare the emergency degree assessment coefficient with an emergency degree assessment coefficient interval corresponding to each set reference rescue emergency level. If the emergency degree assessment coefficient is within the emergency degree assessment coefficient interval corresponding to a certain set reference rescue emergency level, the emergency degree analysis module may determine the rescue emergency level by taking the reference rescue emergency level corresponding to the emergency degree assessment coefficient as the rescue emergency level.

The reference rescue emergency level refers to a rescue emergency level used as a reference when the rescue emergency level is determined.

The emergency degree assessment coefficient interval refers to an emergency degree assessment coefficient interval corresponding to the reference rescue emergency level. In some embodiments, the reference rescue emergency level and the emergency degree assessment coefficient corresponding to the reference rescue emergency level may be determined based on the historical experience or prior knowledge.

In some embodiments of the present disclosure, the rescue emergency level corresponding to the current emergency degree assessment coefficient may be quickly determined based on the emergency degree assessment coefficient interval corresponding to each reference rescue emergency level.

In 270, a corresponding warning prompt may be performed based on the rescue emergency level corresponding to each acquisition point of the disaster-affected region. In some embodiments, the operation 270 may be performed by the processor.

The warning prompt refers to a relevant warning prompt used to remind the user to perform disaster rescue. In some embodiments, the warning prompt may include various forms, such as voice, text, images, or the like.

It should be noted that the rescue emergency level may be set to Level 1, Level 2, and Level 3, wherein Level 1>Level 2>Level 3. When the rescue emergency level corresponding to the disaster-affected region is Level 1, a sound prompt may be given through alternating flashing of a display color and a warning loudspeaker. When the rescue emergency level corresponding to the disaster-affected region is Level 2, the sound prompt may be given through the loudspeaker. When the rescue emergency level corresponding to the disaster-affected region is Level 3, the prompt may be given through alternating flashing of the display color.

Data acquisition of the site of the disaster-affected region may be performed using the UAV. The UAV has the characteristics of being flexible and fast, and can be quickly deployed in the disaster-affected region, and can also carry the high-resolution camera for real-time monitoring of the ground situation. The image data monitored by the UAV may be combined with the acquisition points observed by the meteorological station, so that the impact of the meteorological disaster can be more comprehensively assessed. Then the emergency rescue level corresponding to each acquisition point of the meteorological disaster site may be analyzed and different warning manners may be provided for different emergency rescue levels, and corresponding warning information may be issued according to the data analysis results, so that the occurrence and development of meteorological disasters can be more accurately predicted, the warning information can be issued in time, people's ability to monitor and respond to meteorological disasters can be greatly improved, and the relevant departments can take corresponding rescue and protection measures, thereby effectively reducing the impact and loss of disasters.

It should be noted that the above description of the process is provided only for examples and illustrations, and does not limit the present disclosure to the scope of the embodiments cited. For those skilled in the art, various modifications and changes can be made to the process under the guidance of the present disclosure. However, such modifications and changes remain within the scope of the present disclosure.

FIG. 3 is a schematic diagram illustrating an exemplary acquisition model according to some embodiments of the present disclosure.

In some embodiments, a meteorological data processing module may be configured to determine, based on an acquisition model 320 implanted in a processor, a stability 331 of a building image acquired by an UAV during historical time period and an adjustment amplitude of an acquisition frequency; and send the adjustment amplitude to a meteorological observation station to enable the meteorological observation station to adjust the acquisition frequency of a meteorological acquisition device of each acquisition point based on wireless communication.

The acquisition model 320 refers to a model used to determine an adjusted acquisition frequency. In some embodiments, the acquisition model 320 may be a machine learning model. As shown in FIG. 3, the acquisition model may include a stability assessment layer 321 and an adjustment layer 322.

In some embodiments, the stability assessment layer may be configured to determine the stability of the building image acquired by the UAV by performing comparative analysis on the building images corresponding to different time points acquired by the UAV. The stability assessment layer 321 may be a machine learning model, such as a Convolutional Neural Network (CNN) model, or the like.

In some embodiments, an input of the stability assessment layer 321 may include building images 310 corresponding to different time points acquired by the UAV, and an output of the stability assessment layer 321 may include the stability 331.

The different time points corresponding to the building images 310 may be preset values (e.g., two consecutive shooting time points), or may be determined based on the meteorological data. For example, the greater the wind speed in the meteorological data, the shorter the time intervals between the different time points.

The stability 331 refers to a degree of stability of the building image acquired by the UAV. The stability may be a value between 0 and 1.

In some embodiments, the meteorological data processing module may be configured to obtain the stability assessment layer 321 by training based on second training samples with second labels. A training process for the stability assessment layer may be similar to a training process of the reliability model, which may be found in the previous descriptions in FIG. 2.

In some embodiments, the second training samples may include sample building images at different sample time points, which may be obtained based on the historical data.

The second labels may include stabilities corresponding to the second training samples. The second labels may be manually labeled. For example, similarities and clarities of the building images acquired at different time points may be manually monitored and scored with a value between 0 and 1, and an average of similarity scores and an average of clarity scores may be determined as the stabilities corresponding to the second training samples.

As another example, differences in a count of damaged buildings and an area of damaged buildings in the same region corresponding to different time points may be determined based on building images of the same region corresponding to different time points acquired by the UAV in the historical data, the, and the second labels may be determined based on the differences. The meteorological data processing module may determine the count of damaged buildings and the area of damaged buildings in the building images through an image recognition technique. For example, when the difference is 0, the second label may be marked as 1, and when the difference exceeds a preset difference threshold, the second label may be marked as 0. The second labels may also be determined by linear interpolation and other feasible manners.

In some embodiments, the adjustment layer 322 may determine the adjusted acquisition frequency. The adjustment layer 322 may be a machine learning model, such as a neural network (NN) model, or the like.

In some embodiments, an input of the adjustment layer 322 may include the stability 331, a difference value 332, and a meteorological data combination 333; and an output of the adjustment layer 322 may include an adjusted acquisition frequency 340. The difference value 332 refers to a difference value between a predicted meteorological assessment coefficient during the historical time period and an actual meteorological assessment coefficient corresponding to the acquisition time point. More descriptions may be found in the related descriptions in FIG. 2. The meteorological data combination 333 refers to a combination of meteorological data corresponding to each acquisition time point.

In some embodiments, the meteorological data processing module may be configured to obtain the adjustment layer 322 by training based on third training samples with third labels. A training process of the adjustment layer may be similar to the training process of the reliability model, which may be found in the related descriptions in FIG. 2.

The third training samples may include sample stabilities, sample difference values, and sample meteorological data combinations. The third labels may include actual adjusted acquisition frequencies corresponding to the third training samples. The third training samples and the third labels may be acquired based on the historical data.

In some embodiments, when the adjustment layer is trained, the meteorological data processing module may be configured to generate the training samples and the labels based on processor simulation to expand a training data set. The processor may be further configured to take meteorological data combinations of different time points generated by the simulation as the training samples; and determine the labels corresponding to the training samples based on time features of the meteorological data combinations.

In some embodiments, the meteorological data processing module may be configured to generate the meteorological data combinations of different time points based on the processor by the simulation such as climate simulation or simulation software, to generate the third training samples.

In some embodiments, the meteorological data processing module may be configured to determine the third labels corresponding to the third training samples based on the time features of the meteorological data combinations.

The time features of the meteorological data combinations refer to relevant features of changes in the meteorological data over time in the meteorological data combinations. For example, the time features of the meteorological data combinations may include a minimum time interval, a maximum time interval, and other relevant features of the changes in the meteorological data over time.

In some embodiments, the meteorological data processing module may be configured to determine the corresponding third labels based on the time features of the meteorological data combinations generated by the simulation through an eighth preset rule. The eighth preset rule refers to a preset rule for determining the third labels. An exemplary eighth preset rule may be that the larger the minimum time interval and the maximum time interval in the time features, the larger the corresponding third labels. The eighth preset rule may include the following formula: the third labels=(the minimum time interval+the maximum time interval) *0.5*the stability*a preset meteorological threshold/the difference values.

In some embodiments of the present disclosure, the third training samples may be generated by the simulation and the third labels may be determined, so that the training data set can be expanded, and the training effect of the adjustment layer can be improved.

In some embodiments, the meteorological data processing module may be configured to determine the adjustment amplitude of the acquisition frequency based on the adjusted acquisition frequency 340 and a current acquisition frequency.

In some embodiments of the present disclosure, the adjusted acquisition frequency may be determined based on the stability of the building image acquired by the UAV during the historical time period using the acquisition model 320. The required data can be quickly and efficiently obtained by fully utilizing the data processing capability and the data analysis capability of the machine learning model to make adjustments to the modules related to meteorological data processing in time, thereby avoiding the impact on the monitoring data caused by delayed adjustment.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A multi-channel early warning system for real-time monitoring of meteorological data, comprising:
   a meteorological data acquisition module configured to obtain meteorological data corresponding to each acquisition time point of each acquisition point of a disaster-affected region from a meteorological observation station, the meteorological data including rainfall and wind speed;
   a meteorological data processing module configured to analyze and obtain, based on the meteorological data, a predicted meteorological assessment coefficient corresponding to each acquisition time point of the disaster-affected region; wherein the analyzing and obtaining the predicted meteorological assessment coefficient corresponding to each acquisition time point of the disaster-affected region includes:

calculating, by means of a calculation formula $$\delta_k = \sum_{i=1}^{n} \left( \frac{Ra_{i_k} - Ra_{i_{(k-1)}}}{Ra_{i_{(k+1)}} - Ra_{i_k}} * \omega_1 + \frac{Wv_{i_k} - Wv_{i_{(k-1)}}}{Wv_{i_{(k+1)}} - Wv_{i_k}} * \omega_2 \right),$$

the predicted meteorological assessment coefficient, wherein $\delta_k$ denotes a predicted meteorological assessment coefficient corresponding to a kth acquisition time point of the disaster-affected region, k denotes a number corresponding to each acquisition time point, k=1, 2, 3, ... m, and $Ra_{i_{(k-1)}}$, $Ra_{i_k}$, and $Ra_{i_{(k+1)}}$ denote the rainfall corresponding to (k−1)th, kth, and (k+1)th acquisition time points, respectively, of an ith acquisition point of the disaster-affected region, i denotes a number corresponding to each acquisition point, i=1, 2, 3, ... n, $Wv_{i_{(k-1)}}$, $Wv_{i_k}$, and $Wv_{i_{(k+1)}}$ denote the wind speed corresponding to the (k−1)th, kth, and (k+1)th acquisition time points, respectively, of the ith acquisition point of the disaster-affected region, and $\omega_1$ and $\omega_2$ denote weighting factors corresponding to the rainfall and the wind speed, respectively;

a terrain analysis module configured to obtain a water system distribution map corresponding to the disaster-affected region from a database, and analyze and obtain a terrain complexity assessment coefficient corresponding to the disaster-affected region; wherein the analyzing and obtaining the terrain complexity assessment coefficient corresponding to the disaster-affected region includes:

obtaining a contour density and a contour curvature corresponding to the disaster-affected region from the database, and analyzing and obtaining, based on the contour density and the contour curvature, a terrain relief assessment coefficient corresponding to the disaster-affected region;

obtaining a count of water systems and an area of each of the water systems corresponding to the disaster-affected region from the water system distribution map corresponding to the disaster-affected region, and analyzing and obtaining, based on the count of water systems and the area of each of the water systems, a water system distribution assessment coefficient corresponding to the disaster-affected region;

calculating, by means of a calculation formula $\zeta = \vartheta_1 * \tau_1 + \vartheta_2 * \tau_2$, the terrain complexity assessment coefficient, wherein $\zeta$ denotes the terrain complexity assessment coefficient, $\theta_1$ denotes the terrain relief assessment coefficient, $\theta_2$ denotes the water system distribution assessment coefficient, and $\tau_1$ and $\tau_2$ denote weighting factors corresponding to the terrain relief assessment coefficient and the water system distribution assessment coefficient, respectively; wherein the analyzing and obtaining the terrain relief assessment coefficient corresponding to the disaster-affected region includes:

calculating, by means of a calculation formula $$\vartheta_1 = \frac{De' - De}{De} * \sigma_1 + \frac{Cd' - Cd}{Cd} * \sigma_2,$$

the terrain relief assessment coefficient corresponding to the disaster-affected region, wherein De' denotes the contour density corresponding to a topographic map of the disaster-affected region, Cd' denotes the contour curvature corresponding to the topographic map of the disaster-affected region, De denotes a set reference contour density, Cd denotes a set reference contour curvature, $\sigma_1$ and $\sigma_2$ denote weighting factors corresponding to the contour density and the contour curvature, respectively; and the analyzing and obtaining the water system distribution assessment coefficient corresponding to the disaster-affected region includes:

calculating, by means of a calculation formula $$\vartheta_2 = \sum_{i'=1}^{n'} \left( \frac{Q' - Q}{Q} * \sigma_3 + \frac{S_{i'} - S}{S} * \sigma_4 \right),$$

the water system distribution assessment coefficient, wherein $\theta_2$ denotes the water system distribution assessment coefficient, Q' denotes the count of water systems, $S_{i'}$ denotes an area of an i'th water system in the water system distribution map, i' denotes the number corresponding to each of the water systems in the water system distribution map, i'=1', 2', ..., n', Q denotes a set reference count of water systems, S denotes a set reference area of each of the water systems, and $\sigma_3$ and $\sigma_4$ denote weighting factors corresponding to the count of water systems and the area of each of the water system;

an unmanned aerial vehicle (UAV) deployment module configured to analyze and obtain, based on the predicted meteorological assessment coefficient and the terrain complexity assessment coefficient, a takeoff time point and a flight altitude of a UAV corresponding to the disaster-affected region; wherein the analyzing and obtaining the takeoff time point and the flight altitude of the UAV corresponding to the disaster-affected region includes:

comparing the predicted meteorological assessment coefficient corresponding to each acquisition time point the disaster-affected region with a set predicted meteorological assessment coefficient threshold, and if the predicted meteorological assessment coefficient corresponding to a certain acquisition time point is greater than or equal to the predicted meteorological assessment coefficient threshold, determining that the UAV does not take off; and if the predicted meteorological assessment coefficient corresponding to the certain acquisition time point is less than the predicted meteorological assessment coefficient threshold, determining that the UAV takes off, and taking the certain acquisition time point as the takeoff time point corresponding to the UVA; and comparing the terrain complexity assessment coefficient corresponding to the disaster-affected region with a reference terrain complexity assessment coefficient stored in the database corresponding to each flight altitude of the UVA, if the reference terrain complexity assessment coefficient stored in the database corresponding to a certain flight altitude of the UVA is the same with the terrain complexity assessment coefficient, taking the flight altitude of the UVA corresponding to the reference terrain complexity assessment coefficient in the database as the flight altitude corresponding to the UVA;

a ground situation acquisition module configured to obtain a population density corresponding to the disaster-affected region from the database, and acquire a building image corresponding to the disaster-affected region by the UVA;

an emergency degree analysis module configured to analyze and obtain, based on the building image, a disaster impact assessment coefficient corresponding to the disaster-affected region, and determine, based on the terrain complexity assessment coefficient and the disaster impact assessment coefficient, an emergency degree assessment coefficient corresponding to the disaster-affected region to determine a rescue emergency level of the disaster-affected region; and an early warning terminal configured to perform a corresponding warning prompt based on the rescue emergency level.

2. The multi-channel early warning system of claim 1, wherein the analyzing and obtaining a disaster impact assessment coefficient corresponding to the disaster-affected region includes:

obtaining a count of damaged buildings and an area of damaged buildings in the building image from the building image, and calculating, by means of a calculation formula $$\chi = \frac{Bd - Bd'}{Bd} * \gamma_1 + \frac{Bs - Bs'}{Bs} * \gamma_2 + \frac{Z'}{Z} * \gamma_3,$$

the disaster impact assessment coefficient, wherein x denotes the disaster impact assessment coefficient, Bd denotes a set allowed count of damaged buildings, Bs denotes a set allowed area of damaged buildings, Bd' denotes the count of damaged buildings, Bs' denotes the area of damaged buildings, Z' denotes the population density, Z denotes a set reference population density, and $\gamma_1$, $\gamma_2$, and $\gamma_3$ denote weighting factors corresponding to the count of damaged buildings, the area of damaged buildings, and the population density, respectively.

3. The multi-channel early warning system of claim 1, wherein the analyzing and obtaining an emergency degree assessment coefficient corresponding to the disaster-affected region includes:

calculating, by means of a calculation formula $$\varphi = \frac{\zeta' - \zeta}{\zeta'} * \alpha_1 + \frac{\chi' - \chi}{\chi'} * \alpha_2,$$

the emergency degree assessment coefficient, wherein Φ denotes the emergency degree assessment coefficient, ζ denotes the terrain complexity assessment coefficient, x denotes the disaster impact assessment coefficient, ζ' denotes a set reference terrain complexity assessment coefficient, x' denotes a set reference disaster impact assessment coefficient, and $\alpha_1$ and $\alpha_2$ denote weighting factors corresponding to the terrain complexity assessment coefficient and the disaster impact assessment coefficient, respectively.

4. The multi-channel early warning system of claim 1, wherein the determining a rescue emergency level corresponding to the disaster-affected region includes:

comparing the emergency degree assessment coefficient corresponding to the disaster-affected region with an emergency degree assessment coefficient interval corresponding to each set reference rescue emergency level, and if the emergency degree assessment coefficient is within the emergency degree assessment coefficient interval corresponding to a certain set reference rescue emergency level, determining the rescue emergency level by taking the reference rescue emergency level corresponding to the emergency degree assessment coefficient as the rescue emergency level.

5. The multi-channel early warning system of claim 1, further comprising the database configured to store the water system distribution map, the population density, the contour density, and the contour curvature corresponding to the disaster-affected region, and the reference terrain complexity assessment coefficient corresponding to the UVA at each flight altitude.

* * * * *